(12) United States Patent
Zhou (10) Patent No.: US 8,199,473 B2
(45) Date of Patent: Jun. 12, 2012

(54) SUPPORT STAND FOR FLAT-PANEL DISPLAY MONITOR

(75) Inventor: Fan Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 444 days.

(21) Appl. No.: 12/492,389

(22) Filed: Jun. 26, 2009

(65) Prior Publication Data

US 2010/0079932 A1 Apr. 1, 2010

(30) Foreign Application Priority Data

Sep. 26, 2008 (CN) .......................... 2008 1 0304697

(51) Int. Cl.
*G06F 1/16* (2006.01)
(52) U.S. Cl. ......... 361/679.22; 361/679.21; 361/679.59; 248/917; 248/918
(58) Field of Classification Search .............. 361/679.22
See application file for complete search history.

(56) References Cited

U.S. PATENT DOCUMENTS

| | | | | |
|---|---|---|---|---|
| 6,532,628 B2* | 3/2003 | Kim | ................................ | 16/342 |
| 7,448,583 B2* | 11/2008 | Kim et al. | ................... | 248/278.1 |
| 7,567,436 B2* | 7/2009 | Jeong | ........................ | 361/679.22 |
| 7,593,218 B2* | 9/2009 | Hwang et al. | ............. | 361/679.21 |
| 7,770,856 B2* | 8/2010 | Depay | .......................... | 248/284.1 |
| 7,967,273 B2* | 6/2011 | Zhou et al. | .................. | 248/372.1 |
| 7,971,834 B2* | 7/2011 | Wang et al. | ................. | 248/125.1 |
| 2003/0223188 A1* | 12/2003 | Ha et al. | ....................... | 361/681 |
| 2004/0217244 A1* | 11/2004 | Wu et al. | ..................... | 248/278.1 |
| 2009/0166502 A1* | 7/2009 | Wang et al. | .................... | 248/423 |

FOREIGN PATENT DOCUMENTS

| CN | 2826060 Y | 10/2006 |
|---|---|---|
| CN | 1978930 A | 6/2007 |

* cited by examiner

*Primary Examiner* — Anthony Q Edwards
(74) *Attorney, Agent, or Firm* — Altis Law Group, Inc.

(57) ABSTRACT

A support stand for a flat-panel display monitor includes a support structure, a rotatable bracket, a first hinge assembly having a first pivot shaft, and a second hinge assembly having a second pivot shaft positioned opposite to the first pivot shaft, and a connecting module. The rotatable bracket is sleeved on the first and second pivot shafts and rotatably connected to the support structure by the first and second hinge assemblies. The connecting module connects the first pivot shaft to the second pivot shaft such that the first and second pivot shafts are substantially aligned along a common axis.

18 Claims, 7 Drawing Sheets

SUPPORT STAND FOR FLAT-PANEL DISPLAY MONITOR

CROSS-REFERENCE TO RELATED APPLICATIONS

This application is related to two co-pending U.S. patent applications, application Ser. No. 12/344,675 filed on Dec. 29, 2008, entitled "ROTATABLE MODULE AND SUPPORTING MECHANISM USING THE SAME", and application Ser. No. 12/463,503 filed on May 11, 2009, entitled "SUPPORT STAND FOR FLAT-PANEL DISPLAY MONITOR AND ELEVATING SUPPORT USED FOR SUPPORT STAND", wherein the inventor is Fan Zhou. Such applications have the same assignee as the present application.

BACKGROUND

1. Technical Field

The present disclosure generally relates to panel displays and, particularly, to a support stand for a flat-panel display monitor.

2. Description of Related Art

Flat-panel display monitors, such as liquid crystal display monitors, offer advantages over cathode ray tube displays, such as reduced size and weight, and better image quality. A viewing angle and height of a display screen of the flat-panel display monitor can be adjusted without moving a support stand of the flat-panel display monitor because of its light weight and thin profile.

A commonly used support stand includes a rotatable bracket fixed to the display screen, a support structure having a first end and a second end opposite to the first end, two hinge assemblies, and a base member. The hinge assemblies rotatably connect the first end of the support structure and the rotatable bracket. The base member is connected to the second end of the support structure.

However, in such an arrangement, the two hinge assemblies are separated from each other, and are not aligned along a common axis in assembly. Even if the hinge assemblies are initially aligned along the common axis, they can easily deviate therefrom after repeated adjustments of the viewing angle. If the two hinge assemblies are misaligned, the display screen is skewed to one side. Since the two hinge assemblies are separated from each other, the combined mechanical strength thereof is lacking, such that the arrangement cannot be adapted to be used with larger display screens.

What is needed, therefore, is a support stand for a flat-panel display monitor that overcomes the limitations described.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
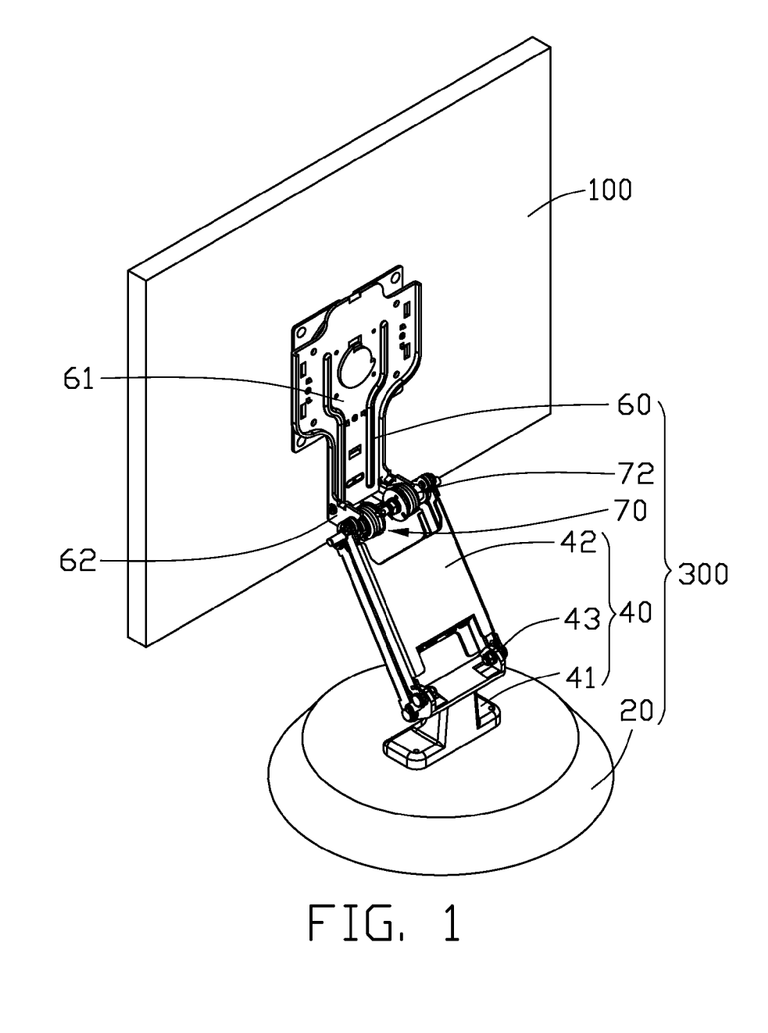
FIG. 1 is an assembled, isometric view of a flat-panel display monitor, the flat-panel display monitor including an embodiment of a support stand, the support stand including a first hinge assembly having a first pivot shaft, a second hinge assembly having a second pivot shaft, and a connecting module.
Figure 2:
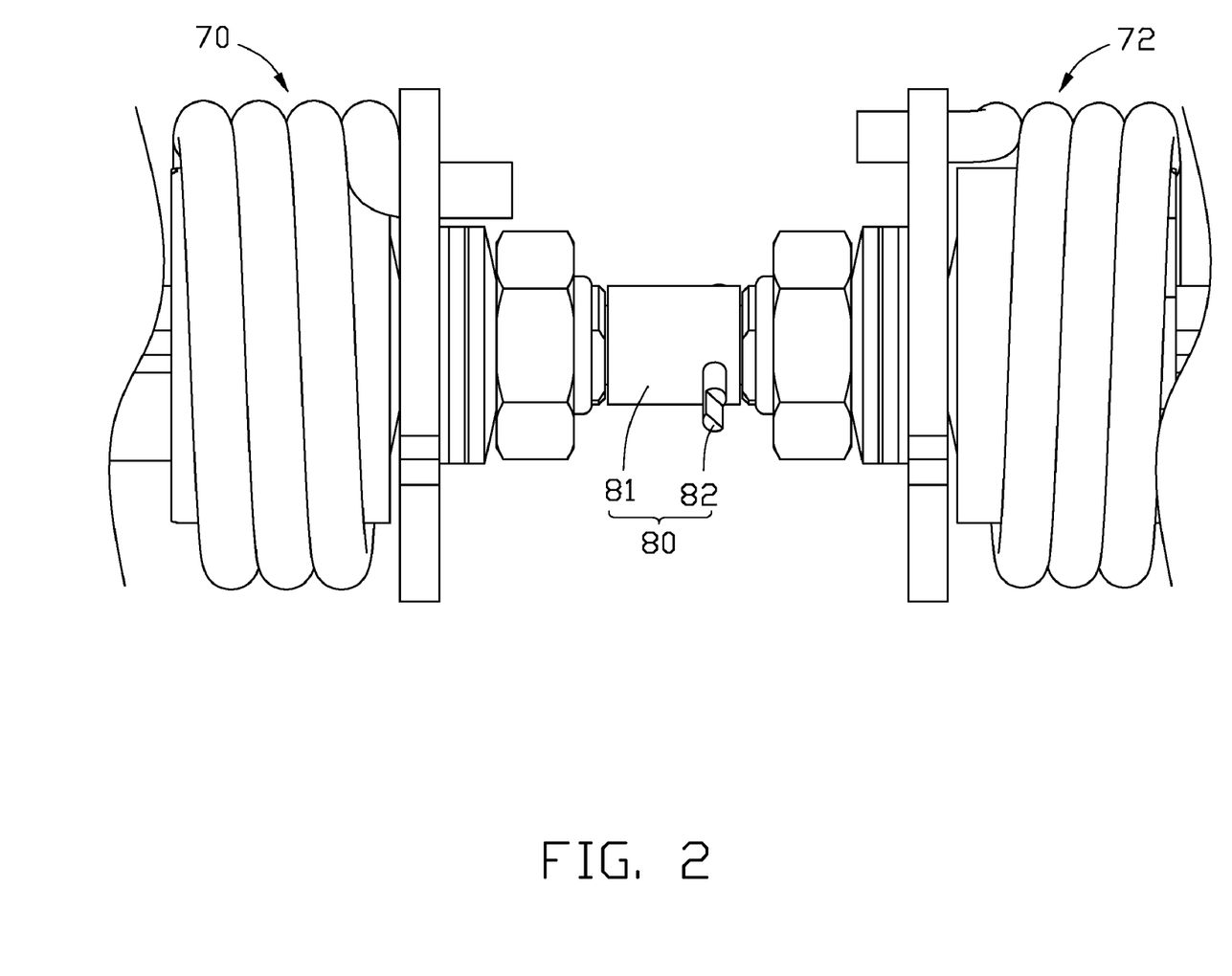
FIG. 2 is an enlarged, assembled view of a portion of the first hinge assembly, a portion of the second hinge assembly, and the connecting module in FIG. 1.
Figure 3:
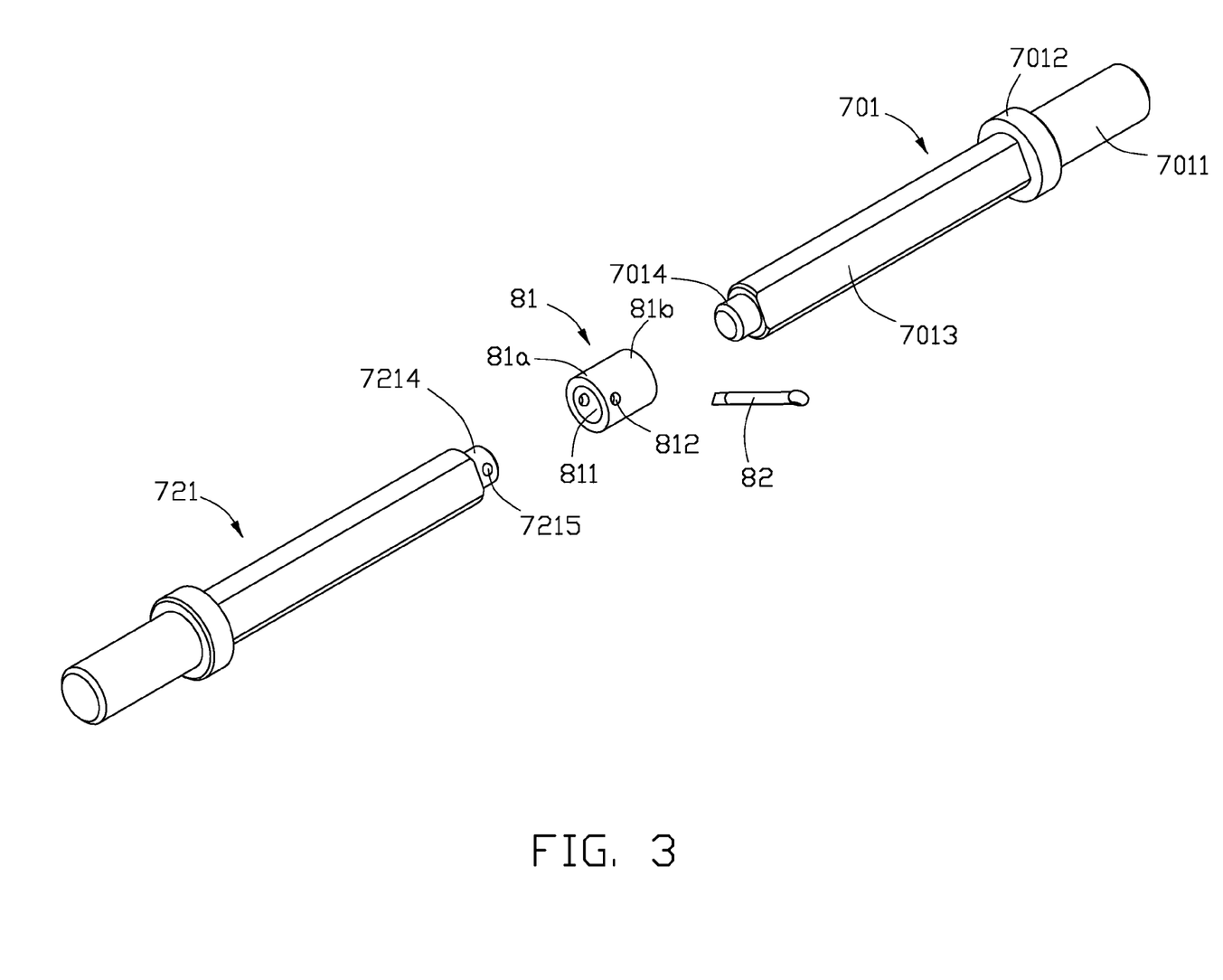
FIG. 3 is an exploded, isometric view of the first and second pivot shafts, and the connecting module.

Referring to FIGS. 1 through 3, a flat-panel display monitor (not labeled) includes a display screen 100 supported by an embodiment of a support stand 300.

The support stand 300 includes a base member 20, a support structure 40, a rotatable bracket 60, a first hinge assembly 70, a second hinge assembly 72, and a connecting module 80. The support structure 40 includes an end connected to the base member 20. The rotatable bracket 60 is connected to the display screen 100. The first and second hinge assemblies 70, 72 rotatably connect the support structure 40 to the rotatable bracket 60. The connecting module 80 connects the first and second hinge assemblies 70, 72.

The support structure 40 includes a support body 41 and a support bracket 42, connected by two rotatable modules 43. The support body 41 is fixed to the base member 20. A first end of the support bracket 42 is connected to the rotatable bracket 60, and a second end of the support bracket 42 is connected to the support body 41.

The first hinge assembly 70 includes a first pivot shaft 701. The first pivot shaft 701 includes a pivot portion 7011, a flange 7012, a shaft portion 7013, and a connecting portion 7014. The pivot portion 7011 and the shaft portion 7013 respectively extend from opposite ends of the flange 7012 along the axis of the first pivot shaft 701. The pivot portion 7011 is substantially cylindrical. A cross-section of the shaft portion 7013 may be non-circular. In the illustrated embodiment, opposite sides of the shaft portion 7013 are flattened, thereby forming a deformed shaft portion. A threaded portion (not shown) is formed on a distal end of the shaft portion 7013 opposite to the flange 7012. The connecting portion 7014 extends from an end surface of the distal end of the shaft portion 7013 and has a diameter less than the shaft portion 7013.

The second hinge assembly 72 is similar in principle to the first hinge assembly 70. The second hinge assembly 72 includes a second pivot shaft 721 having a connecting portion 7214. However, the connecting portion 7214 defines a through hole 7215.

The connecting module 80 includes a connecting member 81 and a fixing member 82. The connecting member 81 is a substantially cylindrical barrel and includes a first end portion 81a and a second end portion 81b opposite to the first end portion 81a. The connecting member 81 defines a receiving hole 811 extending though the first and second end portions 81a, 81b along an axis of the connecting member 81. The first end portion 81a defines a through hole 812 along a radial axis. The through hole 812 corresponds to the through hole 7215 of the second pivot shaft 721. In the illustrated embodiment, the fixing member 82 is a substantially cylindrical pin engaging in the through hole 812 of the connecting member 81 and the through hole 7215 of the second pivot shaft 721. A portion of the receiving hole 811 adjacent to the second end portion 81b may be threaded.

In assembly, the connecting portion 7014 of the first pivot shaft 701 is received in the receiving hole 811 adjacent to the second end portion 81b and the connecting portion 7214 of the second pivot shaft 721 is received in the receiving hole adjacent to the first end portion 81a. The fixing member 82 engages in the through hole 812 of the connecting member 81 and the through hole 7215 of the second pivot shaft 721. An end portion of the fixing member 82 may be bent to prevent the fixing member 82 from detaching from the connecting member 81.

In the support stand 300, the first and second shafts 701, 721 are connected by the connecting module 80, so that the first and second shafts 701, 721 remain substantially aligned along a common axis. Therefore, the display screen 100 is effectively prevented from skewing. In addition, a combined mechanical strength of the first and second hinge assemblies 70, 72, and the connecting module 80 allows the support stand 300 to support larger display screens.

It should be pointed out that the second end portion 81b of the connecting member 81 may also define a through hole. Accordingly, the connecting portion 7014 of the first pivot shaft 701 would also define a through hole so that another fixing member may be received in the through hole of the first pivot shaft 701 and the through hole of the second end portion 81b of the connecting member 81, thereby fixing the first pivot shaft 701 to the connecting member 81. In an alternative embodiment, the connecting members 81 and the through hole 812 of the connecting module 80 and the through hole 7215 of the second pivot shaft 721 may be omitted, whereby each of the connecting portions 7014, 7214 of the first and second shafts 701, 721 has a non-circular cross-section and the receiving hole 811 of the connecting member 81 has a shape corresponding to the connecting portions 7014, 7214. The receiving hole 811 of the connecting member 81 could be slightly smaller than the connecting portions 7014, 7214 such that the connecting portions 7014, 7214 are snugly received in the receiving hole 811 of the connecting member 81 by interference fit. In yet another embodiment, the connecting portions 7014, 7214 may be threaded and the receiving hole 811 of the connecting member 81 reciprocally threaded to engage with the threaded connecting portions 7014, 7214, and prevent the connecting portions 7014, 7214 from detaching from the receiving hole 811 of the connecting member 81.

Figure 4:
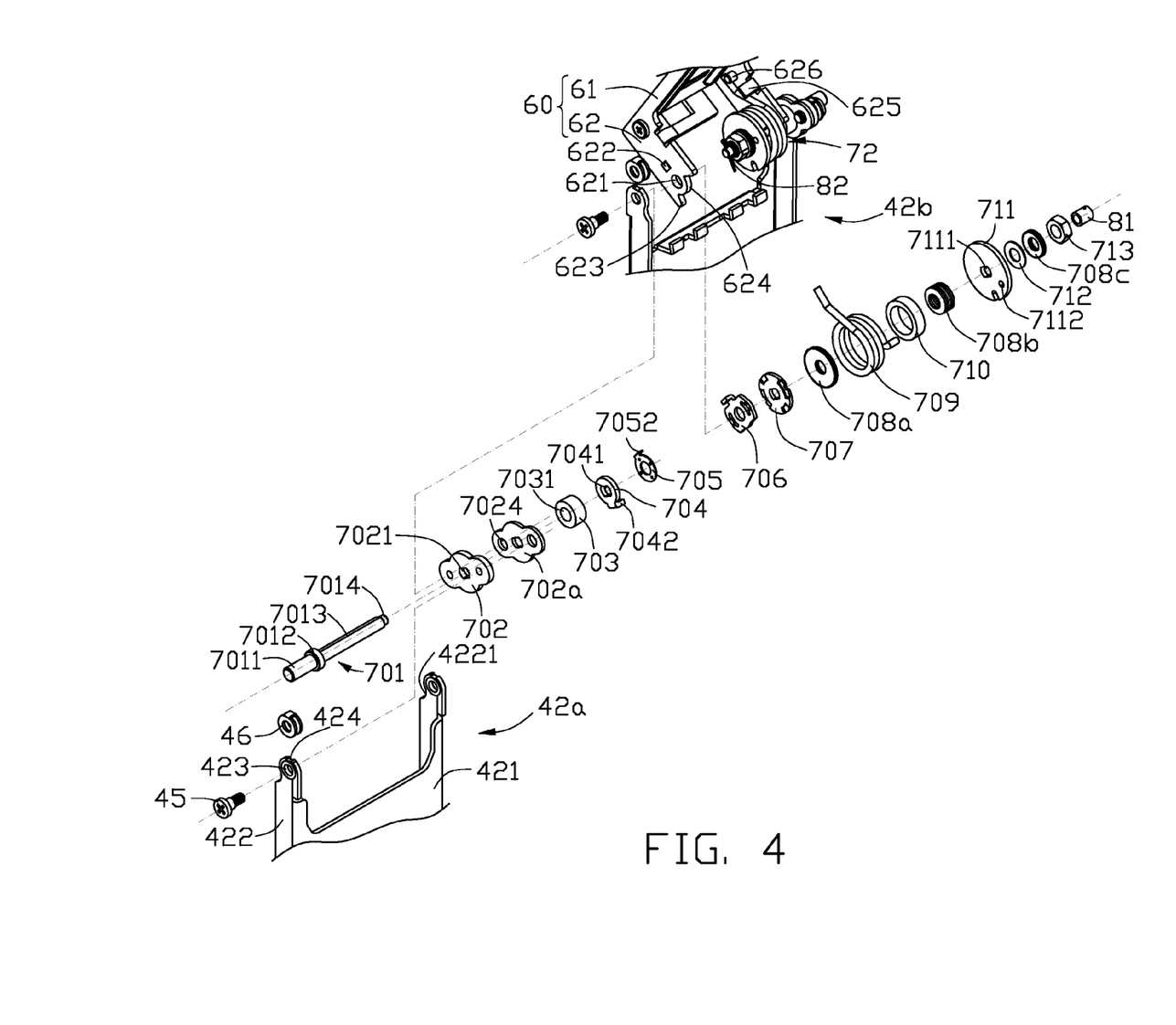
FIG. 4 is a partial, exploded, isometric view of the support stand in FIG. 1, showing the first hinge assembly further including a rotatable washer and a stationary washer.
Figure 5:
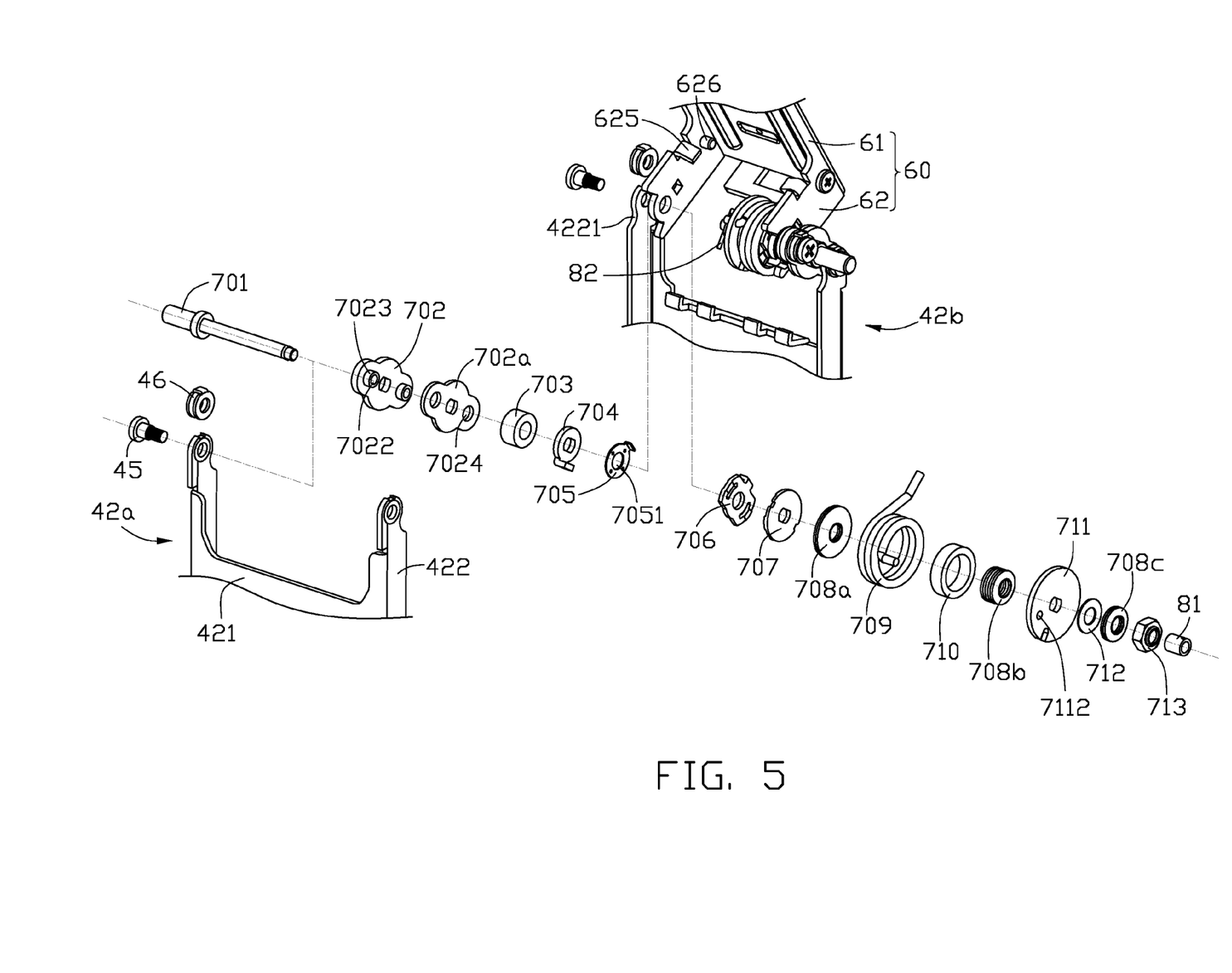
FIG. 5 is similar to FIG. 4, but viewed from another aspect.

Referring also to FIGS. 4 and 5, the support bracket 42 includes a first link bracket 42a, a second link bracket 42b attached to the first link bracket 42a, a plurality of fasteners 45, and a plurality of latching members 46. The first and second link brackets 42a, 42b are substantially H-shaped and each of the first and second link brackets 42a, 42b includes a flat portion 421 and two sidewalls 422 extending from opposite sides of the flat portion 421. Each sidewall 422 defines a pivot hole 423 in an end portion thereof and a latching groove 424 in an edge of the end portion. The sidewall 422 forms a curved surface 4221 on the end portion adjacent to the pivot hole 423. When the first and second link brackets 42a, 42b are attached, the curved surfaces 4221 face each other, thereby restricting the pivot portion 7011 of the first pivot shaft 701 between the curved surfaces 4221. Each latching member 46 includes two annular pieces (not labeled) and a connecting piece (not labeled) connecting the annular pieces. The connecting piece is configured to be received in the latching groove 424.

The rotatable bracket 60 includes a mounting portion 61 and two side plates 62 extending substantially perpendicularly from opposite sides of the mounting portion 61. The mounting portion 61 is configured to be fixed to a rear wall of the display screen 10. Each side plate 62 defines a substantially circular pivot hole 621, and a fixing hole 622 adjacent to the pivot hole 423 in an end portion thereof. The first and second pivot shafts 701, 721 rotatably engage in the corresponding pivot holes 621 of the side plates 62 such that the side plates 62 are connected to the corresponding first and second hinge assemblies 70, 72. Each side plate 62 includes two restricting protrusions 623 extending from the end portion and the restricting protrusions 623 cooperatively define a curved restricting groove 624. Each of the side plates 62 also forms a latching tab 625 on an edge portion away from the restricting groove 624. A latching fastener (not labeled) is received in each side plate 62 adjacent to the latching tab 625, forming a blocking portion 626. It should be noted that the blocking portion 626 may also be integrally formed with each side plate 62.

The first hinge assembly 70 may further include a supporting block 702, and a strengthening member 702a corresponding to the supporting block 702, a resisting sleeve 703, a limiting washer 704, a frictional washer 705, a rotating washer 706, a stationary washer 707, a plurality of resilient washers 708a, 708b, 708c, a torsion spring 709, a ring 710, a resisting member 711, a washer 712, and a fastening member 713.

The supporting block 702 defines a deformed through hole 7021 in a middle portion thereof and two pivot holes 7022 adjacent to the through hole 7021. A periphery of each pivot hole 7022 forms a substantially cylindrical sleeve portion 7023.

The strengthening member 702a is similar to the supporting block 702 except that the strengthening member 702a defines two through holes 7024 corresponding to the sleeve protrusions 7023 of the supporting block 702. The sleeve protrusions 7023 may be received in the through holes 7024, to enhance a mechanical strength of the supporting block 702.

The resisting sleeve 703 is substantially cylindrical, and defines a circular pivot hole 7031.

The limiting washer 704 defines a deformed through hole 7041 in a middle portion such that the limiting washer 704 is non-rotatably sleeved on the shaft portion 7013 of the first pivot shaft 701. A fixing tab 7042 is formed on an edge portion of the limiting washer 704 to be received in the restricting groove 624 of the rotatable bracket 60.

The frictional washer 705 defines a substantially circular through hole 7051 in a middle portion such that the frictional washer 705 is rotatably sleeved on the shaft portion 7013 of the first pivot shaft 701. A positioning tab 7052 is formed on an edge portion of the frictional washer 705 and an extending direction of the tab 7052 is substantially parallel to an axis of the frictional washer 705. The tab 7052 may be received in the fixing hole 622 of the rotatable bracket 60 such that the frictional washer 705 is non-rotatable relative to the rotatable bracket 60. The frictional washer 705 may also define a plurality of lubricating oil grooves (not labeled) in a side surface thereof.

Figure 6:
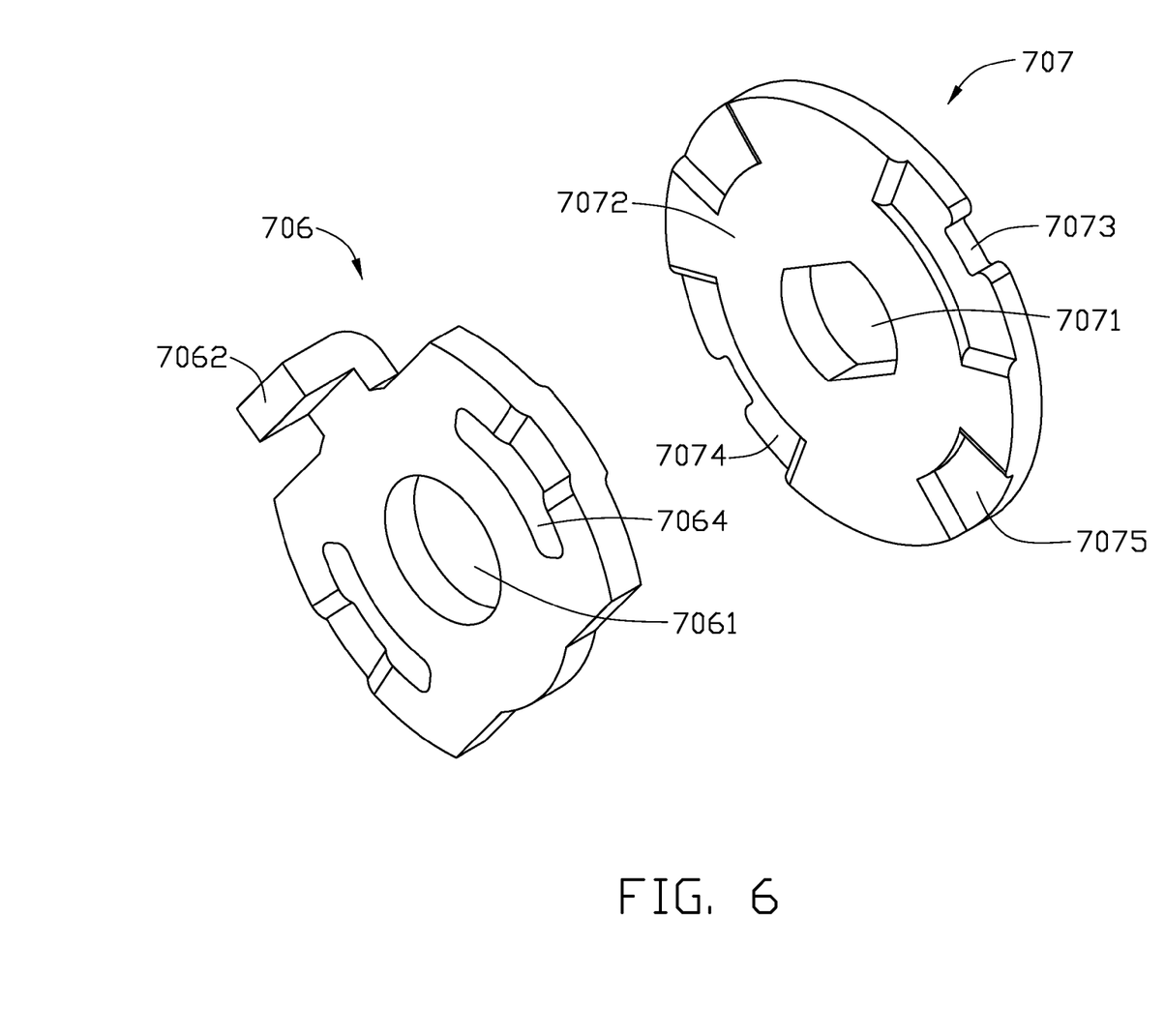
FIG. 6 is an isometric view of the rotatable washer and the stationary washer of FIG. 4.
Figure 7:
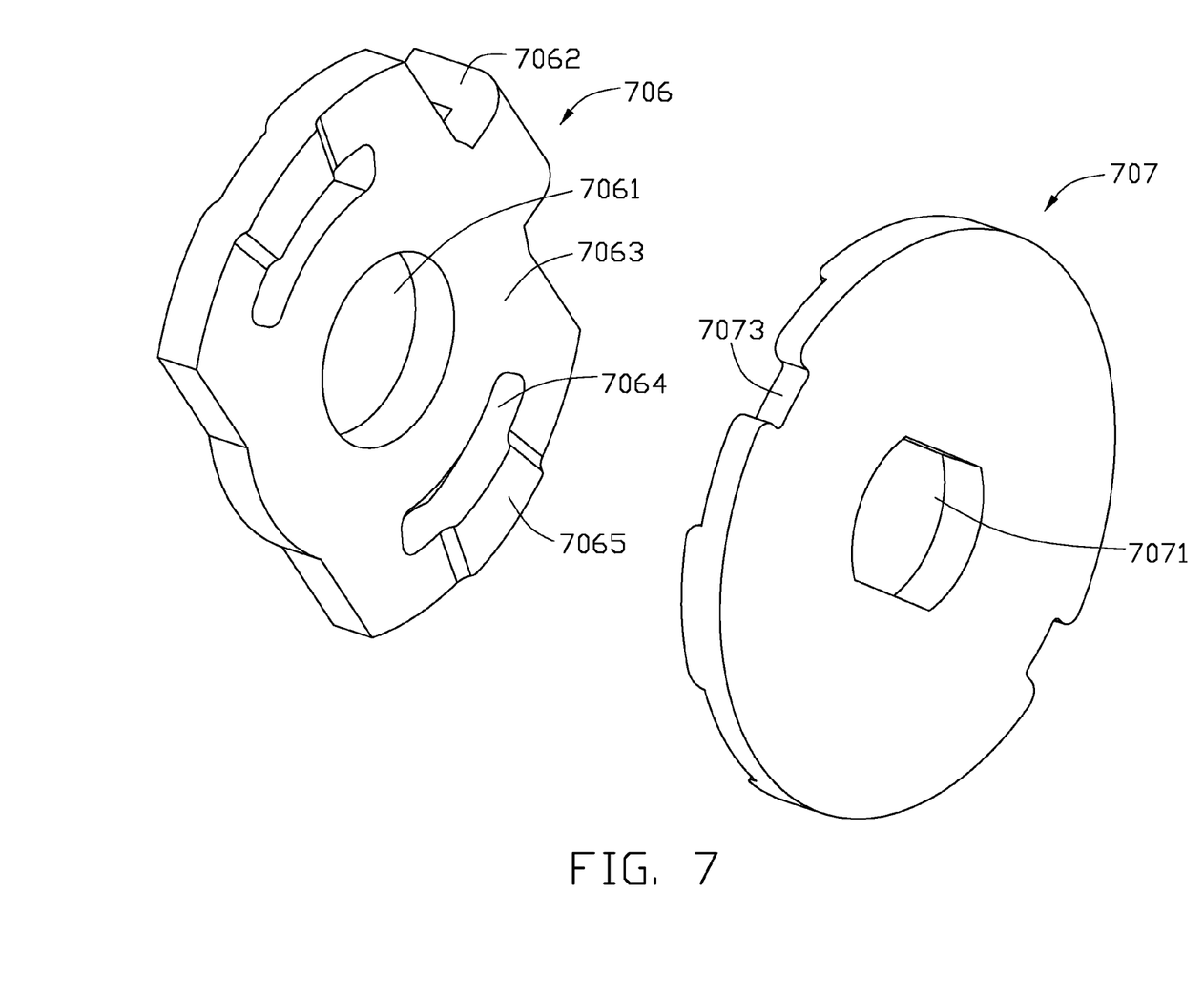
FIG. 7 is similar to FIG. 6, but viewed from another aspect.

Referring also to FIGS. 6 and 7, the rotating washer 706 defines a substantially cylindrical shaft hole 7061 in a middle portion such that the rotating washer 706 is rotatably sleeved on the first pivot shaft 701. A positioning tab 7062 extends from an edge of the rotating washer 706 and engages in the fixing hole 622 of the rotatable bracket 60 such that the rotatable bracket 60 rotates the rotating washer 706. The rotating washer 706 includes an engaging surface 7063 and further defines two through holes 7064 adjacent to the shaft hole 7061. The two through holes 7064 are symmetrical relative to the shaft hole 7061. In addition, a boundary portion between the periphery of the rotating washer 706 and one through hole 7064 forms a protrusion 7065 on the engaging surface 7063.

In formation of the protrusion 7065, each of the two through holes 7064 prevents other portions of the rotating washer 706 adjacent to the protrusion 7065 from deforming.

The stationary washer 707 defines a deformed shaft hole 7071 in a middle portion such that the stationary washer 707 is non-rotatably sleeved on the first pivot shaft 701. The stationary washer 707 includes a resisting surface 7072. The stationary washer 707 defines two buffering cut-outs 7073 and two grooves 7074 adjacent to the two buffering cut-outs 7073 in the resisting surface 7072. The two grooves 7074 are symmetrical relative to the deformed shaft hole 7071 and may be formed on the resisting surface 7072 by a punching process. When one of the grooves 7074 is formed, metallic material flows to one corresponding buffering cut-out 7073. In other words, the buffering cut-outs 7073 receive metallic material flowing from the grooves 7074 during the punching process. A depth of the grooves 7074 is about 0.3 millimeters (mm) to about 1.0 mm.

In the illustrated embodiment, the stationary washer 707 further defines two grooves 7075 that are symmetrical relative to the deformed shaft hole 7071. A depth of the grooves 7075 is about 0.3 mm to about 1.0 mm. When a thickness of the grooves 7075 is about 0.3 mm to about 0.5 mm, the grooves 7075 may be formed by controlling a clearance of the punching mold parts, without forming a buffering cut-out before forming the grooves 7075. If a thickness of the grooves 7075 exceeds about 0.5 mm, buffering cut-outs may need to be formed before the grooves 7075 are formed by the punching process. The grooves 7074, 7075 engage with the protrusions 7065 of the rotating washer 706 such that the rotating washer 706 and the stationary washer 707 may be maintained in a plurality of relatively stable positions.

It may be understood that the buffering cut-outs 7073 may be replaced by other buffering portions such as buffering holes to receive material flowing from other portions. In addition, the protrusions 7065 may be formed on the resisting surface 7072 of the stationary washer 707, and accordingly, the grooves 7074, 7075 and the buffering cut-out 7073 may be defined in the engaging surface 7063 of the rotating washer 706.

Each of the resilient washers 708a, 708b, 708c may be a plurality of spring washers contacting each other, and rotatably sleeved on the shaft portion 7013 of the first pivot shaft 701. Alternatively, the resilient member 708a, 708b, 708c may be helical springs, or elastic rubber rings.

The torsion spring 709 includes a plurality of spring rings, and two fixing portions (not labeled) extending from opposite ends of the torsion spring 709.

The ring 710 is substantially cylindrical, and may be rotatably sleeved on the shaft portion 7013 of the first pivot shaft 701.

The resisting member 711 may be substantially disk-shaped. The resisting member 711 defines a deformed through hole 7111 in a middle portion such that the resisting member 711 is non-rotatably sleeved on the pivot shaft 701, and a through hole 7112 to receive one fixing portion of the torsion spring 709.

The second hinge assembly 72 is similar in principle to the first hinge assembly 70. Thus, the second hinge may further include a plurality of components similar to the components of the first hinge assembly 70 described.

The support stand 300 may be assembled as follows. To connect the support bracket 42 and the rotatable bracket 60 by the first and second hinge assemblies 70, 72, a latching member 46 positioned adjacent to the pivot hole 423 on a first end of the first link bracket 42a, with the connecting piece received in the latching groove 424. The pivot portion 7011 of the first pivot shaft 701 is positioned between the curved surfaces 4221 of the support bracket 42. A first fastener 45 passes through one pivot hole 423, in the first end of the first link bracket 42a and one pivot hole 7022 of one supporting block. A second fastener 45 passes through one pivot hole 423, in the first end of the second link bracket 42b and another pivot hole 7022 of the supporting block 702. Thus, a first side of the first end of the first link bracket 42a and the second link bracket 42b are connected by the supporting block 702 of the first hinge assembly 70. A second side of the first end of the first link bracket 42a and the second link bracket 42b are connected by a supporting block of the first hinge assembly 72 in a similar method. As a result, the first and second pivot shafts 701 are non-rotatable relative to the support bracket 42.

During assembly of the first hinge assembly 70, the shaft portion 7013 of the first pivot shaft 701 passes (in order) through the through hole 7021 of the supporting block 702, the through hole 7021 of the strengthening member 702a, the resisting sleeve 703, the limiting washer 704, the frictional washer 705, the pivot hole 621 of the rotatable bracket 60, the rotating washer 706, the stationary washer 707, the resilient member 708a, the resilient member 708b, the ring 710, the torsion spring 709, the resisting member 711, the washer 712, and the resilient members 708c, in that order. The fastening member 713 is fixed on the shaft portion 7013 to prevent these components from detaching from the first pivot shaft 701.

The two cylindrical sleeve protrusions 7023 of the supporting block 702 are received in the two through holes 7024 of the strengthening member 702a. The limiting tab 7042 is received in the restricting groove 624 and the ring 710 is sleeved on the resilient members 708a, 708b. The torsion spring 709 is sleeved on the ring 710 such that one fixing portion of the torsion spring 709 is latched in the through hole 7112 of the resisting member 711 and the other fixing portion of the torsion spring 709 resists between the latching tab 625 and the blocking portion 626 of the rotatable bracket 60. The rotating washer 706 is rotatably sleeved on the shaft portion 7013 and fixed on the rotatable bracket 60. The stationary washer 707 is non-rotatably sleeved on the shaft portion 7013 of the first pivot shaft 701. Thus, the first pivot shaft 701 is non-rotatably positioned on one supporting block 702. The resilient members 708 provide an axial force such that the engaging surface 7063 resists the resisting surface 7072 snugly.

The second end portion 81b of the connecting member 81 is sleeved on the connecting portion 7014 of the first pivot shaft 701. The second hinge assembly 702 is then similarly assembled as the first hinge assembly 70, with the connecting portion 7214 of the second pivot shaft 721 received in the first end portion 81a. The fixing member 82 engages in the through hole 812 of the connecting member 81 and the through hole 7215 of the second pivot shaft 721. Thus, the first and second shafts 701, 721 are connected by the connecting module 80.

Finally, a second end of the first and a second end of the second link bracket 42b are rotatably connected to the support body 41 by the two rotatable modules 43. The support body 41 is fixed to the base member 20.

When the support stand 300 is used for supporting a flat-panel display monitor, the mounting portion 61 of the rotatable bracket 60 is fixed to the rear wall of the display screen 100.

In use, an external force may be applied on the display screen 100, thereby driving the rotatable bracket 60 to rotate the rotating washer 706. The connecting module 80 maintains the first and second pivot shafts 701, 721 in a substantially coaxial relationship.

After the rotating washer 706 has rotated to a first angle, the protrusions 7065 of the rotating washer 706 are received in the grooves 7074 of the stationary washer 707 such that the rotating washer 706 and the stationary washer 707 can be maintained in a first stable position.

After the rotating washer 706 has rotated to a second angle, the protrusions 7065 of the rotating washer 706 are received in the grooves 7075 of the stationary washer 707 such that the rotating washer 706 and the stationary washer 707 can be maintained in a second stable position.

After the rotatable bracket 60 has rotated to the second angle, the restricting protrusion 623 of the rotatable bracket 60 resists the limiting tab 7042 of the limiting washer 704, thereby limiting a rotating angle to which the display screen 100 can rotate.

It should be noted that the supporting blocks 702 connecting the first link bracket 42*a* and the second link bracket 42*b* may be omitted. In addition, the protrusions 7065 may be formed on the resisting surface 7072 of the stationary washer 707, and accordingly, the grooves 7074, 7075 and the buffering cut-out 7073 may be defined in the engaging surface 7063 of the rotating washer 706. The strengthening members 702*a* may also be omitted. The support structure 40 may have other configurations or be replaced by a supporting frame.

It should also be noted that the first and second hinge assemblies 70, 72 may differ from each other, and the receiving hole 811 of the connecting member 81 omitted. Accordingly, each of the first and second end portions 81*a*, 81*b* of the connecting member 81 forms a latching portion, and an end of each of the first and second pivot shafts 701, 721 forms a locking portion locked with the latching portion. In addition, the ends of the first and second pivot shafts 701, 721 may be welded or adhered to the first and second end portions 81*a*, 81*b* of the connecting member 81.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A support stand for a flat-panel display monitor, the support stand comprising:
    a support structure;
    a first hinge assembly comprising a first pivot shaft;
    a second hinge assembly comprising a second pivot shaft positioned opposite to the first pivot shaft;
    a rotatable bracket sleeved on the first and second pivot shafts and rotatably connected to the support structure by the first and second hinge assemblies; and
    a connecting module connecting the first pivot shaft to the second pivot shaft such that the first and second pivot shafts are substantially aligned along a common axis;
    wherein each of the first and second pivot shafts comprises a connecting portion extending from an end thereof; the connecting portion of the second pivot shaft defines a through hole; the connecting module comprises a connecting member and a fixing member, the connecting member comprises a first end portion and a second end portion, the connecting member defines a receiving hole extending though the first and second end portions along an axis of the connecting member, the first end portion defines a through hole along a radial axis corresponding to the through hole of the second pivot shaft; the connecting portion of the second pivot shaft is received in the receiving hole adjacent to the first end portion, and the fixing member is received in the through hole of the connecting member and the through hole of the second pivot shaft; and the connecting portion of the first pivot shaft is received in the receiving hole adjacent to the second end portion.

2. The support stand of claim 1, wherein the connecting portion of the first pivot shaft defines a through hole; the second end portion of the connecting member defines a through hole along a radial axis corresponding to the through hole of the first pivot shaft; the connecting portion of the first pivot shaft is received in the receiving hole adjacent to the second end portion; and the connecting module further comprises another fixing member received in the through hole of the connecting member and the through hole of the first pivot shaft.

3. The support stand of claim 2, wherein the connecting member is a substantially cylindrical barrel, the through holes are substantially circular, and the fixing members are substantially cylindrical pins.

4. The support stand of claim 1, wherein each of the first and second hinge assemblies comprises a rotating washer, a stationary washer, a resilient member, and a fastening member; the rotating washer is rotatably sleeved on the pivot shaft, and has an engaging surface; the stationary washer is non-rotatably sleeved on the pivot shaft, and has a resisting surface facing the engaging surface of the rotating washer; the resilient member urges the rotating washer to resist the stationary washer; the fastening member prevents the rotating washer, the stationary washer, and the resilient member from detaching from the pivot shaft; one of the engaging surface and the resisting surface forms a plurality of protrusions and the other defines a plurality of grooves engaging with the protrusions; and at least one buffering portion is defined adjacent to or in at least one of the grooves to receive material flowing from the at least one buffering portion adjacent to the groove when the grooves are formed by punching.

5. The support stand of claim 4, wherein the at least one buffering portion is at least one buffering hole or at least one buffering cut-out.

6. The support stand of claim 4, wherein both the rotating washer and the stationary washer define a shaft hole; the protrusions are formed on a periphery of the stationary washer or the rotating washer by a punching process, and a through hole is defined between the protrusions and the shaft hole.

7. The support stand of claim 4, wherein a depth of the grooves is about 0.3 mm to about 1.0 mm.

8. The support stand of claim 1, wherein the support structure comprises a base member, a support body, a support bracket, and two rotatable modules connecting the support body and the support bracket; the support body is fixed to the base member; and a first end of the support bracket is connected to the support body and a second end of the support bracket is connected to the rotatable bracket by the first and second hinge assemblies.

9. The support stand of claim 8, wherein the support bracket comprises a first link bracket and a second link bracket; each of the first and second hinge assemblies comprises a supporting block; one end of the first link bracket and the second link bracket is rotatably connected to the support body by rotatable modules, and the other end of the first link bracket and the second link bracket is connected by the supporting blocks; and the first and second pivot shafts are non-rotatably positioned on the supporting blocks.

10. The support stand of claim 9, wherein each of the first and second link brackets comprises a flat portion and two sidewalls extending from opposite sides of the flat portion; each sidewall defines a pivot hole in an end portion thereof; each of the first and second pivot shafts comprises a flange with a shaft portion extending therefrom; each supporting block defines a deformed through hole corresponding to the shaft portion and two pivot holes adjacent to the through hole; the shaft portion passes through the deformed through hole of one supporting block; and a first fastener passes through the pivot hole of the first link bracket and one of the two pivot holes of one of the two supporting blocks, a second fastener passes through the pivot hole of the second link bracket and the other one of the two pivot holes of the one of the two supporting blocks, such that the first link bracket and the second link bracket are connected by the supporting blocks.

11. The support stand of claim 10, wherein each of the first and second hinge assemblies further comprises a strengthening member; a periphery of each of the two pivot holes of the supporting block forms a substantially cylindrical sleeve protrusion; each of the strengthening members defines two through holes corresponding to the two sleeve protrusions; and the sleeve protrusions of the supporting blocks are received in the through holes of the strengthening members.

12. The support stand of claim 10, wherein each of the first and second hinge assemblies further comprises a connecting member, a resisting member, a ring, and a torsion spring; the rotatable member comprises a mounting portion and two side plates extending substantially perpendicular from opposite sides of the mounting portion, each side plate defines a substantially circular pivot hole and forms a latching tab on an edge portion and a blocking portion adjacent to the edge portion; each of the first and second pivot shafts passes through the pivot hole of each side plate; the resisting member is non-rotatably sleeved on the pivot shaft, and defines a through hole; the ring is sleeved on the rotating washer and the stationary washer, and the torsion spring is sleeved on the ring; the torsion spring comprises a first fixing portion resisting between the latching tab and the blocking portion, and a second fixing portion received in the through hole of the resisting member.

13. The support stand of claim 12, wherein each of the first and second hinge assemblies further comprises a limiting washer forming a limiting tab and is non-rotatably sleeved on the pivot shaft; each side plate further forms two restricting protrusions away from the mounting portion and defines a curved restricting groove between the restricting protrusions; and the limiting washer is adjacent to the side plate and the limiting tab resists the restricting groove.

14. A flat-panel display monitor comprising:
a display screen;
a support stand supporting the display screen, the support stand comprising:
  a support structure;
  a rotatable bracket comprising a mounting portion fixed to a rear wall of the display screen and two side plates extending substantially perpendicularly from opposite sides of a bottom portion, each side plate defines a pivot hole;
  a first hinge assembly comprising a first pivot shaft;
  a second hinge assembly comprising a second pivot shaft, wherein each of the first and second pivot shaft passing though the pivot hole of a corresponding side plate of the rotatable bracket such that the rotatable bracket rotatably is connected to the support structure by the first and second hinge assemblies; and
  a connecting module connecting the first pivot shaft to the second pivot shaft such that the first and second pivot shafts are substantially aligned along a common axis;
wherein each of the first and second pivot shaft comprises a connecting portion extending from an end thereof; the connecting portion of the second pivot shaft defines a through hole; the connecting module comprises a connecting member and a fixing member, the connecting member comprises a first end portion and a second end portion, the connecting member defines a receiving hole extending though the first and second end portions along an axial direction of the connecting member, the first end portion defines a through hole along a radial axis corresponding to the through hole of the second pivot shaft; the connecting portion of the second pivot shaft is received in the receiving hole adjacent to the first end portion, and the fixing member is received in the through hole of the connecting member and the through hole of the second pivot shaft; and the connecting portion of the first pivot shaft is received in the receiving hole adjacent to the second end portion.

15. The flat-panel display monitor of claim 14, wherein each of the first and second hinge assemblies comprises a rotating washer, a stationary washer, a resilient member, and a fastening member; the rotating washer is rotatably sleeved on the pivot shaft, and has an engaging surface; the stationary washer is non-rotatably sleeved on the pivot shaft, and has a resisting surface facing the engaging surface of the rotating washer; the resilient member urges the rotating washer to resist the stationary washer; the fastening member prevents the rotating washer, the stationary washer, and the resilient member from detaching from the pivot shaft; one of the engaging surface and the resisting surface forms a plurality of protrusions, and the other defines a plurality of grooves engaging with the protrusions; and at least one buffering portion is defined adjacent to or in at least one of the grooves to receive material flowing from the at least one buffering portion adjacent to the groove when the grooves are formed by punching.

16. The flat-panel display monitor of claim 14, wherein the support structure comprises a base member, a support body, a support bracket, and two rotatable modules connecting the support body and the support bracket; the support body is fixed to the base member; and a first end of the support bracket is connected to the support body and a second end of the support bracket is connected to the rotatable bracket by the first and second hinge assemblies.

17. The flat-panel display monitor of claim 16, wherein the support bracket comprises a first link bracket and a second link bracket; each of the first and second hinge assemblies comprises a supporting block; one end of the first link bracket and the second link bracket are rotatably connected to the support body by rotatable modules, and the other end of the first link bracket and the second link bracket are connected by the supporting blocks; the first and second pivot shafts are non-rotatably positioned on the supporting blocks.

18. The flat-panel display monitor of claim 17, wherein each of the first and second link brackets comprises a flat portion and two sidewalls extending from opposite sides of the flat portion, each sidewall defines a pivot hole in an end portion thereof; each of the first and second pivot shafts comprises a flange, and a shaft portion extending from the flange; each supporting block defines a deformed through hole corresponding to the shaft portion and two pivot holes adjacent to the through hole, the shaft portion passes through the deformed through hole of one supporting block; and a first fastener passes through the pivot hole of the first link bracket and one of the two pivot holes of one of the two supporting blocks, a second fastener passes through the pivot hole of the second link bracket and the other one of the two pivot holes of the one of the two supporting blocks, such that the first link bracket and the second link bracket are connected by the supporting blocks.

* * * * *